Feb. 12, 1963     H. M. HIND     3,077,217
PROCESS FOR REMOVAL OF SEED COATS AND
FOREIGN MATTER FROM NUTS

Filed March 7, 1960     3 Sheets-Sheet 1

INVENTOR.
HOBART M. HIND
BY
Max R. Millman
ATTORNEY

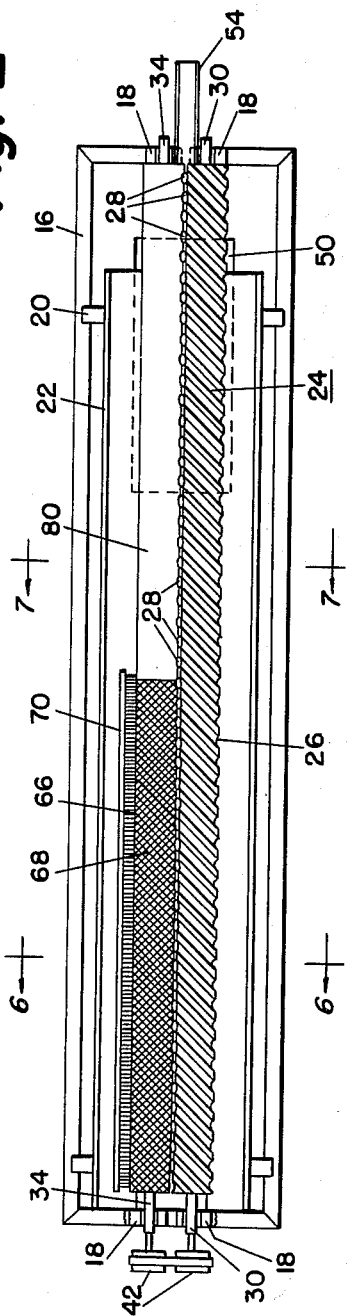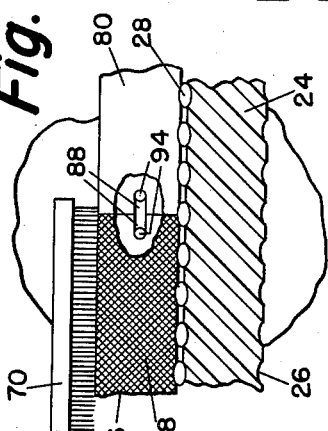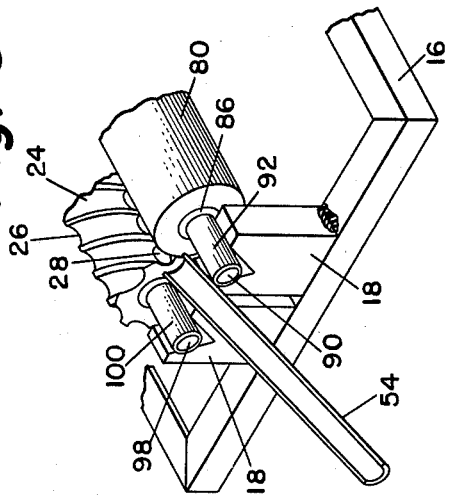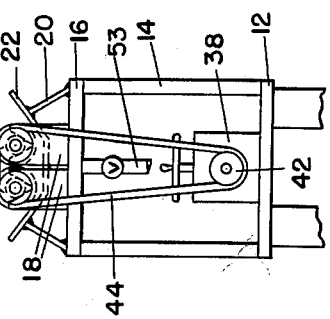

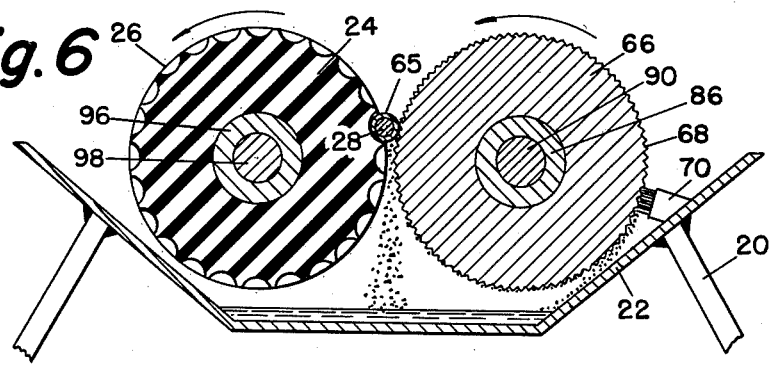
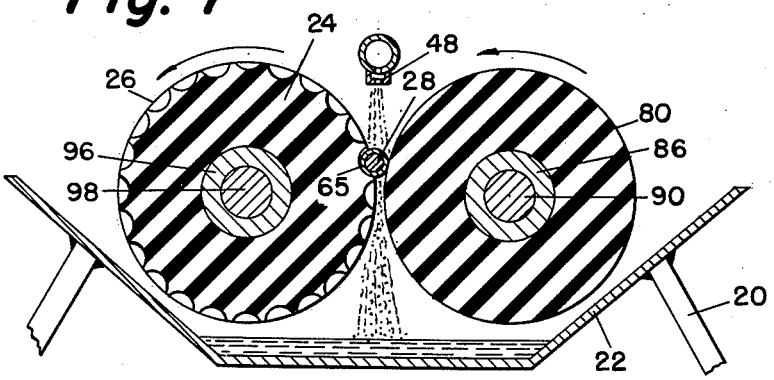
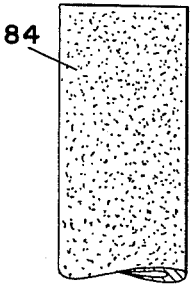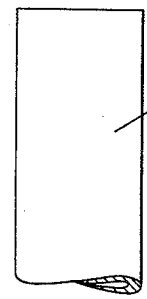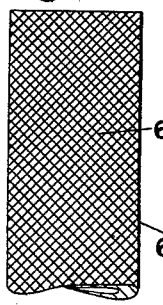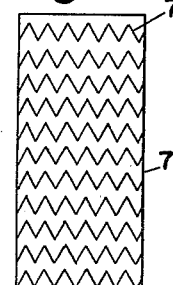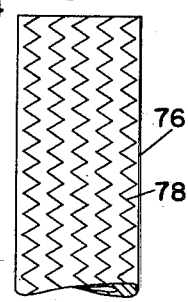

United States Patent Office 3,077,217
Patented Feb. 12, 1963

3,077,217
PROCESS FOR REMOVAL OF SEED COATS AND FOREIGN MATTER FROM NUTS
Hobart M. Hind, Fort Washington, Pa.
(P.O. Box 304, Graceville, Fla.)
Filed Mar. 7, 1960, Ser. No. 12,980
9 Claims. (Cl. 146—221.7)

This invention relates to an efficient process and apparatus for blanching as well as for removing foreign matter, such as pieces of peanut plant, dirt, insect infestation, etc. from peanuts.

At peanut shelling mills, hulls, ovaries and most of the visible foreign matter are removed and the whole nuts are graded as to size and quality which takes into consideration such factors as discoloration, insect damage and the like. Those dicotyledons which are split are graded as to the amount of dirt which accumulates on the exposed inside faces of the halves. The splits which are too dirty are termed "dirty faces" and are sold at a relatively low price to mills for the expression and extraction of oil. Usually included in the splits are immature nuts termed "shrivels."

Heretofore, there have been two methods of blanching or removing seed coats from whole peanuts and none for blanching and cleaning up "dirty faces."

One method, which is relatively inexpensive, is known as dry blanching and consists essentially of subjecting the nuts to temperatures as high as 325° F., cooling the nuts and shucking them between large rubber drums. There are several disadvantages to this process. Firstly, the high temperature, causing as it does auto-oxidation, degrades the flavor of the nuts before they are finally cooked. Secondly, the drums split more than 30 percent of the nuts, and thirdly, the nuts have poor storage or shelf life.

Another method, which is relatively expensive, is known as water blanching and requires essentially the slitting of the skins with knives, as in the Green Patent No. 2,558,899, then the scalding of the nuts with near boiling temperatures and finally the rubbing off of the skins by the use of an oscillating pad. There are also a number of disadvantages to this process. In the first place, aside from expense, the water blanching process, because of the skin slitting operation and the oscillating pad is limited to a great extent to the processing of whole nuts of substantial diameter, such as medium or extra large Virginias; it cannot blanch small nuts such as Spanish. In the second place, the water temperatures are not high enough to eliminate the hardier stages of insect infestation, but sufficiently high to denature the proteins at the nut surface, thereby producing an objectionable hard texture in the final cooked product. And in the third place, this hard denatured surface is an impediment to the removal of excess moisture so that after the final cook the residual moisture in the nuts seriously limits shelf life of the nuts.

It is the primary object of this invention to provide an inexpensive and easily operable process and apparatus for blanching and removing foreign matter from all species and grades of nuts, whole or split, and particularly from "dirty faces" whereby the latter can safely be employed in edible products, such as peanut butter and confections.

Another object of the invention is to provide an apparatus and process of the character described which overcome all of the disadvantages noted above with respect to both the dry and water blanching processes.

Another object of the invention is to provide a process of treating shelled peanuts wherein mild abrasion, spraying with hot water and drying with dielectric heat are so combined that blanched, clean nuts result which no not possess protein-denatured hard surfaces and oxidized degraded flavor and at the same time are of such low moisture content as to render them storable for long periods without danger of mold growth.

Another object of the invention is to provide an apparatus for blanching peanuts and simultaneously removing foreign matter which so combines a variable conveyor with variable abrasion rollers coacting therewith and variable hot water spray that the apparatus can accommodate all species and grades of nut from Spanish #1 with the thinnest seed coat and plant wax to Virginias whose seed coats and plant waxes are the thickest.

These and other objects of the invention will become more apparent as the following description proceeds in conjunction with the accompanying drawings, wherein:

FIGURE 2 is a plan view of the conveyor, abrasion rolls and tray;

FIGURE 3 is an end view of the feed end of the apparatus with the hopper removed;

FIGURE 4 is a fragmentary, enlarged, partially broken away plan view of the central portion of the conveyor and abrasion rollers of FIGURE 2 and illustrating the manner of attachment of the different abrasion rollers;

FIGURE 5 is an enlarged perspective view of the discharge end of the conveyor;

FIGURE 6 is an enlarged sectional view taken on the line 6—6 of FIGURE 2;

FIGURE 7 is an enlarged sectional view taken on the line 7—7 of FIGURE 2; and

FIGURES 8–12 are fragmentary elevational views of different types of abrasion rollers utilizable in the apparatus.

Specific reference is now made to the drawings wherein similar reference characters are used for corresponding elements throughout.

Figure 1:
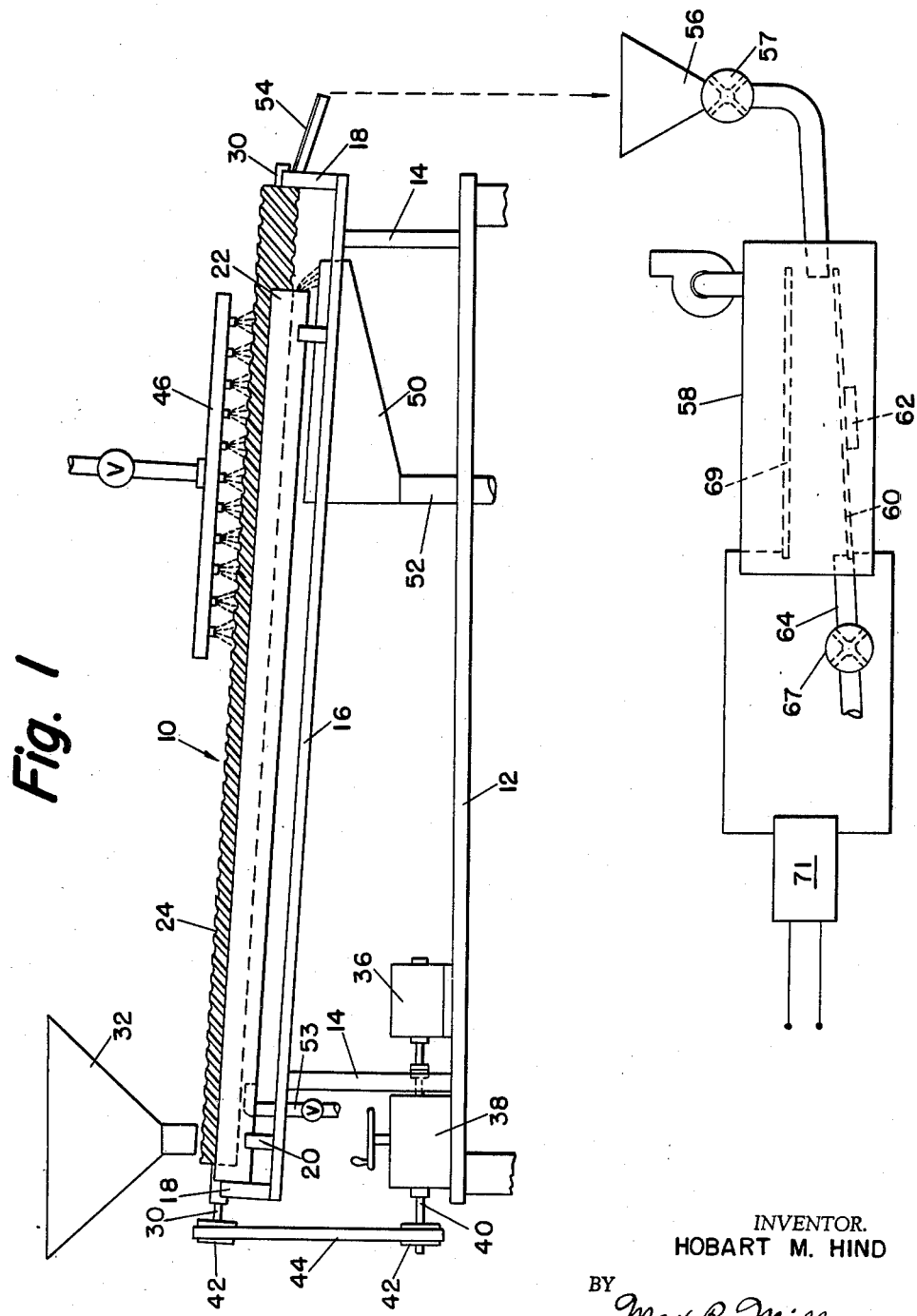
FIGURE 1 is a diagrammatic elevational view of the over-all apparatus.

The unit to remove seed coat and foreign or extraneous matter is generally indicated at 10 and includes a support member 12 having uprights 14 which in turn support an elongated inclined rectangular frame 16, the ends of which carry bearing blocks 18. Secured upon the frame 16 by standards 20 is an elongated trough 22.

Extending lengthwise of the frame 16 spaced above the tray, is a rubber conveyor roll 24 with a helical groove 26 cut therein forming a worm shaft for conveying shelled peanuts 28. The ends of the conveyor 24 are formed with stub shafts or pintles 30 which are journaled in the bearings 18, the shelled peanuts being delivered to the upper feed end of the conveyor from a hopper 32 which is supported thereabove by any suitable means (not shown).

An abrasion roll or combination of rolls extends lengthwise of the frame and also includes pintles or stub shafts 34 at its ends which are journaled in the adjacent bearings 18 on the ends of the frame.

The conveyor 24 and the abrasion rolls are preferably driven in unison by means of a motor 36 mounted on the support 12, which via a variable gear unit 38 drives a shaft 40 which in turn drives the conveyor and abrasion rolls by the use of appropriate sheaves 42 on the shaft 40 and pintles 30 and 34 at the feed end of the apparatus and an endless belt 44 trained over the sheaves.

Mounted for movement longitudinally of the conveyor frame is a valved hot water spraying unit 46 having heads 48 adapted to spray water in substantially parallel streams upon the peanuts in their line of conveyance as shown in FIGURE 7. Adjacent the discharge end of the conveyor, the frame 16 mounts a further trough 50 for the receipt of water, seed coats and extraneous foreign matter which is delivered to waste by a suitable conduit 52. A valved conduit 53 is provided in the trough 22 at or near the feed end of the conveyor for connection to a source of water to flush out the seed coatings from this region. At the lower end of the frame 16 and in substantial alignment with the path of peanut conveyance, between the rolls is a downwardly inclined, blanched, peanut receiving chute 54.

The clean blanched peanuts are conveyed to a hopper or equivalent unit 56 provided with a revolving gate 57 which delivers them into a conventional vacuum dielectric heater 58 upon a shelf electrode 60 which is mounted in the heater for shaking or agitation as at 62, the clean, blanched dry peanuts finally passing to appropriate bags or containers via a conduit 64 which is also provided with a revolving gate 67. The polarity of the shelf electrode 60 and the other electrode 69 thereabove and the necessary current required for operation of the dielectric heater 58 are supplied by a suitable generator 71.

The apparatus is designed to carry out a process of blanching and removing foreign matter from all species and grades of peanuts and especially from "dirty faces" and to produce nuts which do not have a hard protein-denatured surface and oxidized degraded flavor and yet are sufficiently dry to be capable of storage for long periods of time without fear of mold growth. To accomplish this requires certain interrelated conditions which will be described hereinafter.

In order to avoid splitting or other damage to the nut while removing seed coats 65 and foreign matter, I prefer to use a worm or conveyor roll 24 which is made of rubber. To avoid loss of pieces of nuts between the rolls, the helical groove 26 is so cut into the conveyor roll, that the total distance from the depth of the thread to the abrasive roll is slightly less than one-half the diameter of the nuts being processed. Hence by changing the diameter of the conveyor rolls, generally from 2½" to 4", and the tolerance between the rolls, the apparatus can accommodate all sizes of nuts. The lengths of the rolls may also be varied as may the distance between the threads in the conveyor roll. To insure a steady conveyance of nuts from the feed end to the discharge end with as little possibility of crushing the conveyed nuts, the nuts are fed from above and both the conveyor roll or worm 24 and the abrasive roll are rotated in the same direction, namely in a counter-clockwise direction looking towards the feed end as shown by the arrows in FIGURES 6 and 7. To secure a better force vector forward and a diminished force vector upwardly, the angle of the thread face relative to the longitudinal axis of the conveyor roll may be varied. Angles of 22½° to 45° between the thread face and a plane perpendicular to the axis of the conveyor roll have been found effective.

To remove the seed coat, plant wax and other foreign matter without splitting or otherwise damaging the nuts, the abrasive action must be more aggressive with nuts having thicker seed coats and plant waxes, such as Virginias, than with nuts of thinner waxes and coats such as Spanish. Also, the abrasive action on the nuts prior to the application of the hot water spray must be somewhat more severe than the abrasive action during the hot water spray. To satisfy the need for variability in abrasive action, I use a plurality of removably connected abrasive rolls, two being usually sufficient. Thus, the abrasive roll 66 extending for the first half the length of the conveyor roll 24 from the hopper down is preferably a steel roll with a knurled surface 68 as shown in FIGURES 2, 4, 6 and 10. A brush 70 may be provided to scrape the seed coat particles out of the knurls. Instead of a knurled roll, a rubber or steel roll 72 may be employed with circumferential herringbone grooves 74 or one 76 with axial herringbone grooves 78. Varying the depth of the knurls 68 or the depth and angle and arrangement of the herringbone grooves 72 and 76 will provide milder or more severe abrasive action as needed.

Coupled by any suitable means, to the inner end of the first abrasive roll 66, 72 or 76, is a second roll 80 with a milder abrasive surface since it is disposed in the zone of action wherein the hot water spray impinges on the conveyed nuts. Thus the second roll may be of smooth rubber as at 82 or creped or tacky as at 84. It is to be understood that although segmented abrasive rolls (two or more interconnected rolls of varying abrasive surfaces) are preferred, a single abrasive roll coextensive with the feed worm 24 may also be used. Abrasive action may also be changed by varying the relative speeds of rotation of the feed worm and the abrasive roll.

Although a number of means of removably coupling the abrasive rolls endwise may be employed, one means suitable for the purpose, consists of metal sleeves 86 extending axially through each length of roll, the opposite ends of the sleeves including short axial slots 88 terminating at the end faces of the roll, see FIGURE 4. A single mandrel 90 is provided which extends through the sleeves 86 and exceeds the length of the combined rolls 66 and 80, the end portions of the mandrel extending beyond the rolls being the pintles 34 which are journaled in the bearing blocks 18 as previously described. Bushings 92 may be provided to rotatably receive the ends of the mandrel 90, the bushings being seated in the V-notches of the bearing blocks 18. At the center of the mandrel, a few inches apart, the same is provided with radial pins 94, which terminate below the surface of the abrasive rolls. The abrasive rolls to be connected are slipped on to the mandrel from the free ends thereof until the meeting faces abut and the radial pins 94 are received in the end axial slots 88 as shown in FIGURE 4.

For the sake of uniformity, the conveyor roll 24 may also be provided with an axial sleeve 96 through which extends a mandrel 98 which is keyed to the sleeve by any suitable means. The portions of the mandrel beyond the ends of the conveyor roll are received in bushings 100 that are mounted in the V-notches of the adjacent bearing blocks 18, the end portions of the mandrel 98 and the bushings 100 together constituting the pintles 30 previously described.

The nuts are sprayed at a temperature of 140° F. to 175° F. and a pressure of 40 p.s.i. to 80 p.s.i. The temperature is insufficient to cause protein denaturation and the pressure is insufficient to blast the nuts into separate halves, but both are sufficient to soften the plant wax and lift the seed coat and together with mild abrasion, assure complete removal of the seed coat and foreign matter from all species and grades of nuts, including "dirty faces." The effect of this hot water spray is to soften the plant wax to the point where the nut is moveable in the loose skin. Gentle abrasion or scuffing action plus the light pressure of the spray will remove the seed coats without the need to slice them with knives. The extraneous matter is also effectively washed away. While the spray may be applied over the entire length of the conveyor, generally it need only be applied to the lower section of the conveyor from a predetermined point of dry abrasion. One method of determining this point is to abrade a grade of nuts dry for a given length of time and for a given speed of rotation so that the abrasion is slightly too great as evidenced by the marring of the nuts under the coat, then employing the same method while introducing the water spray at points spaced from the delivery end until there is no marring of the nuts beneath the coats. I have also discovered that air under pressure, preferably moisture-laden and at a temperature capable of softening the plant wax but below that which will denature the protein surface, i.e. 140°–175° F., may be substituted for the water spray particularly for the small nuts, such as Spanish #1.

The blanched nuts free of extraneous or foreign matter will travel via the vibrating conveyor through the dielectric vacuum heater 58. An oven employing a vacuum pressure of about 40 mm. and electrodes supplying at least about 7 kv. and at least about 25 mc. will produce temperatures of about 175° F. The nuts will pass through the oven for a length of time sufficient to yield a residual moisture content of 4–5% which permits long storage without fear of mold growth.

While a preferred embodiment of the invention has been shown and described hereabove, it will be understood that a skilled artisan may make minor variations without departing from the spirit of the invention and the scope of the appended claims.

I claim:

1. A process of removing seed coats and foreign matter from shelled nuts comprising conveying the nuts in a zone, abrading the nuts while in said zone and at the same time applying fluid to the nuts at a temperature of 140–175° F., the temperature of the fluid being sufficient to soften the plant wax but lower than that necessary to denature the surface protein.

2. The process of claim 1 wherein the pressure of the fluid is sufficient to raise the seed coats from the nuts and expose the plant wax but insufficient to split the nuts.

3. The process of claim 1 and passing the nuts through a vacuum heater below protein denaturation temperature for a time sufficient to reduce the moisture of the nuts to a content of no greater than 5%.

4. A process of removing seed coats and foreign matter from shelled nuts comprising conveying the nuts along a circuitous path, first abrading the seed coats dry for a given length of path, then rubbing the seed coats wet for the remaining length of path while spraying the nuts with hot fluid at a pressure sufficient to raise the coats without fracturing the nuts and at a temperature sufficient to soften the plant wax without denaturing the surface protein.

5. The process of claim 4 wherein the dry abrasive action is harsher than the wet rubbing action.

6. The process of claim 4 wherein the degree of abrasive action is variable along the path of conveyance.

7. The process of claim 4 and passing the nuts through a vacuum heater below protein denaturation temperature for a time sufficient to reduce the moisture of the nuts to a content of no greater than 5%.

8. A process of removing seed coats and foreign matter from shelled nuts comprising conveying the nuts, first abrading the seed coats dry for a given length of path, then rubbing the seed coats wet for the remaining length of path while spraying the nuts with hot fluid at a temperature of 140–175° F. and a pressure not exceeding 80 p.s.i., and finally passing the nuts through a vacuum heater with agitation at a temperature not exceeding 175° F. for a time sufficient to yield nuts with a moisture content not exceeding 5%.

9. A process of removing seed coats and foreign matter from shelled nuts comprised of conveying the nuts in a zone, abrading the nuts while in said zone and at the same time subjecting the nuts to hot air at a temperature of 140–175° F. and at a pressure sufficient to raise the seed coats from the nuts and expose the plant wax but insufficient to split the nuts, said temperature being sufficient to soften the plant wax but lower than that necessary to denature the surface protein.

References Cited in the file of this patent

UNITED STATES PATENTS

| | | |
|---|---|---|
| 385,870 | Melkersman | July 10, 1888 |
| 1,970,540 | Benham | Aug. 21, 1934 |
| 2,366,711 | Earle | Jan. 9, 1945 |
| 2,405,292 | Curlee | Aug. 6, 1946 |
| 2,579,245 | Steiner | Dec. 18, 1951 |